(12) United States Patent
Andrews

(10) Patent No.: US 9,149,013 B2
(45) Date of Patent: Oct. 6, 2015

(54) IRRIGATION SYSTEM INCLUDING A GRAPHICAL USER INTERFACE

(75) Inventor: Reece R. Andrews, Arlington, NE (US)

(73) Assignee: Lindsay Corporation, Omaha, NE (US)

( * ) Notice: Subject to any disclaimer, the term of this patent is extended or adjusted under 35 U.S.C. 154(b) by 429 days.

(21) Appl. No.: 13/564,344

(22) Filed: Aug. 1, 2012

(65) Prior Publication Data

US 2014/0039696 A1    Feb. 6, 2014

(51) Int. Cl.
| | | |
|---|---|---|
| *G05D 11/00* | (2006.01) | |
| *G05B 11/01* | (2006.01) | |
| *G05B 15/00* | (2006.01) | |
| *G06F 3/048* | (2013.01) | |
| *A01G 27/00* | (2006.01) | |
| *B05C 5/04* | (2006.01) | |
| *B05B 1/08* | (2006.01) | |
| *A01G 25/00* | (2006.01) | |
| *A01G 25/16* | (2006.01) | |
| *G05B 19/042* | (2006.01) | |

(52) U.S. Cl.
CPC ............ *A01G 25/16* (2013.01); *G05B 19/0426* (2013.01); *G05B 2219/2625* (2013.01)

(58) Field of Classification Search
CPC ........... G05D 7/00; G05D 7/06; G05D 11/00; G05B 19/0426; G05B 2219/2625; G05B 11/01; G05B 15/00; A01G 25/16; A01G 25/00; A01G 17/00; G06Q 10/087; G06Q 10/063; G06Q 50/02; G06Q 50/00; G06Q 11/00

USPC ............. 700/284, 17, 83; 239/70, 83, 99, 63; 715/771, 772

See application file for complete search history.

(56) References Cited

U.S. PATENT DOCUMENTS

| | | | |
|---|---|---|---|
| 2006/0027677 A1* | 2/2006 | Abts ............................... 239/67 |
| 2011/0190948 A1* | 8/2011 | Fekete .......................... 700/284 |
| 2012/0215366 A1* | 8/2012 | Redmond et al. ............. 700/284 |
| 2012/0254784 A1* | 10/2012 | Vander Griend et al. ...... 715/771 |
| 2013/0099022 A9* | 4/2013 | Palmer et al. ................... 239/63 |

* cited by examiner

*Primary Examiner* — Mohammad Ali
*Assistant Examiner* — Md Azad
(74) *Attorney, Agent, or Firm* — Hovey Williams LLP

(57) ABSTRACT

A system for managing irrigation equipment comprises a first irrigation system for applying water in a first irrigated area, a second irrigation system for applying water in a second irrigated area, a control system for controlling the irrigation systems, and a user interface for enabling a user to configure the control system. The user interface presents a map view of a geographic area including the irrigated areas and includes a first graphical element corresponding to the first irrigation system and a second graphical element corresponding to the second irrigation system. The user interface further presents a first interactive control panel for controlling the first irrigation system concurrently with the map view when the user selects the first graphical element, and presents a second interactive control panel for controlling the second irrigation system concurrently with the map view when the user selects the second graphical element.

5 Claims, 9 Drawing Sheets

Equipment

| | Name | ⚠ | | Status | Duration | 📶 | Last Update |
|---|---|---|---|---|---|---|---|
| ☐ | ★ Lagoon | | | Running, 72 psi, 624 gpm | 2 days, 4.5 hrs | 📶 | 2012-05-02 08:18:03 AM |
| ☐ | ★ Lagoon 1 | | | Forward Wet, 24% / 0.65 in | 4.8 hrs | 📶 | 2012-05-02 08:27:14 AM |
| ☐ | ☆ Leased 24-21 | | | Reverse Wet, 15% / 0.80 in | 15.2 hrs | 📶 | 2012-05-02 07:42:46 AM |
| ☐ | ☆ Southwest Home Place | | | Reverse Chemigating, 80% / 0.25 in | 14.1 hrs | 📶 | 2012-05-02 08:22:23 AM |
| ☐ | ★ T-16 23 | | | Running, 68 psi, 1,865 gpm | 6.2 hrs | 📶 | 2012-05-02 08:18:03 AM |
| ☐ | ★ T-16 23-1 | | | Forward Wet, 50%, 0.75 in | 0.6 hrs | 📶 | 2012-05-02 08:27:14 AM |
| ☐ | ★ T-16 23-2 | ⚠ | | Stopped Alignment Fault | 2.8 hrs | 📶 | 2012-05-02 07:42:46 AM |
| ☐ | ★ T-16 23-3 | | | Forward Wet, 20%, 1.00 in | 9.2 hrs | 📶 | 2012-05-02 08:08:53 AM |
| ☐ | ★ T-16 23-4 | ⚠ | | Stopped, Low Pressure | 12 hrs | 📶 | 2012-05-02 08:06:03 AM |
| ☐ | ☆ Wheat 27 | | | Stopped, 56 psi, 0 gpm | 6.2 hrs | 📶 | 2012-05-02 08:11:45 AM |
| ☐ | ☆ Wheat 27-1 | | | Reverse Dry, 90% | 2.3 hrs | 📶 | 2012-05-02 08:15:19 AM |
| ☐ | ☆ Wheat 27-2 | | | Reverse Dry, 90% | 1.8 hrs | 📶 | 2012-05-02 08:16:40 AM |
| ☐ | ☆ Wheat 27-3 | | | Stopped | 62 days, 13.2 hrs | 📶 | 2012-05-02 08:09:52 AM |
| ☐ | ☆ Wheat 27-4 | | | Stopped | 63 days, 2 hrs | 📶 | 2012-03-27 06:18:03 AM |

FIG. 10

IRRIGATION SYSTEM INCLUDING A GRAPHICAL USER INTERFACE

BACKGROUND

1. Field

Embodiments of the present invention relate to user interfaces for irrigation systems. More particularly, embodiments of the invention relate to graphical user interfaces for remotely monitoring and controlling irrigation systems.

2. Related Art

Mobile irrigation systems used in the agricultural industry include elevated water conduits with a plurality of sprinkler heads depending from the conduits for dispensing water to an irrigated area. The water conduits are supported by towers mounted on wheels that propel the towers along the ground to be irrigated. Pivot type irrigation systems include a series of sections connected at a pivot end to a water source such that the sections follow a circular or curved path about the pivot end during operation. Lateral type irrigation systems also include a series of sections, but rather than pivoting about a single point follow a generally linear path.

Users must manage various aspects of the operations of such irrigation systems including, for example, water application rates, irrigation starting positions, irrigation ending positions, irrigation start times, direction of travel of the irrigation systems, and application of chemicals via irrigation system accessories. Modern irrigation systems include control systems for automatically managing certain aspects of irrigation system operations. Such control systems allow users to program irrigation start positions, irrigation end positions, irrigation application rates, irrigation start times and other operational parameters. Such control systems may additionally allow users to program irrigation system accessories, such as accessories for applying pesticides and fertilizers.

It is often desirable or necessary to modify the operation of irrigation systems during operation in response to, for example, changes in weather or to allow for maintenance of the irrigation system or the irrigated area in which the system operates. There may be tens or even hundreds of irrigation systems controlled by a single irrigation control system, and a user may need to make a modification when he or she is in the field performing visual inspections of the irrigation systems and corresponding irrigated areas. Modern irrigation control systems are not suited to enable users to quickly and easily modify operation of multiple irrigation systems. Accordingly, there is a need for a system which overcomes these limitations.

SUMMARY

An irrigation management system in accordance with an embodiment of the invention comprises a control system that controls a first irrigation system that applies water in a first irrigated area and a second irrigation system that applies water in a second irrigated area.

The irrigation management system further includes a user interface that enables a user to configure the control system. The user interface presents a map view of a geographic area including the first irrigated area and the second irrigated area, and includes a first graphical element corresponding to the first irrigation system and a second graphical element corresponding to the second irrigation system. The user interface presents a first interactive control panel for controlling the first irrigation system concurrently with the map view when the user selects the first graphical element, and presents a second interactive control panel for controlling the second irrigation system concurrently with the map view when the user selects the second graphical element.

A method in accordance with another embodiment of the invention comprises displaying a graphical user interface with a map view of a geographic area. The graphical user interface includes a first graphical element associated with a first irrigation system located in the geographic area and a second graphical element associated with a second irrigation system located in the geographic area. A first plurality of control elements is displayed in response to a first input received from a user indicating selection of the first graphical element. The first plurality of control elements is displayed concurrently with the map view and enables the user to control the first irrigation system, such that operation of the first irrigation system is changed in response to user interaction with the first plurality of control elements.

A second plurality of control elements is displayed in response to a second input received from a user indicating selection of the second graphical element. The second plurality of control elements is displayed concurrently with the map view and enables the user to control the second irrigation system, such that operation of the second irrigation system is changed in response to user interaction with the second plurality of control elements.

A system in accordance with yet another embodiment of the invention comprises one or more computers and a computer-readable medium coupled to the one or more computers having instructions stored thereon. When the instructions are executed by the one or more computers they cause the one or more computers to perform operations.

The operations include displaying a graphical user interface with a map view of a geographic area including a first graphical element associated with a first irrigation system located in the geographic area and a second graphical element associated with a second irrigation system located in the geographic area. A first plurality of control elements is displayed in response to a first input received from a user indicating selection of the first graphical element. The first plurality of control elements is displayed concurrently with the map view and enables the user to control the first irrigation system, such that operation of the first irrigation system is changed in response to user interaction with the first plurality of control elements.

The operations further include displaying a second plurality of control elements in response to a second input received from a user indicating selection of the second graphical element. The second plurality of control elements is displayed concurrently with the map view and enables the user to control the second irrigation system, such that operation of the second irrigation system is changed in response to user interaction with the second plurality of control elements.

A computer-readable, non-transitory storage medium in accordance with yet another embodiment of the invention stores instructions, which, when executed by a processor, causes the processor to perform operations.

The operations include displaying a graphical user interface with a map view of a geographic area including a first graphical element associated with a first irrigation system located in the geographic area and a second graphical element associated with a second irrigation system located in the geographic area. A first plurality of control elements is displayed in response to a first input received from a user indicating selection of the first graphical element. The first plurality of control elements is displayed concurrently with the map view and enables the user to control the first irrigation system, such that operation of the first irrigation system is changed in response to user interaction with the first plurality of control elements.

The operations further include displaying a second plurality of control elements in response to a second input received from a user indicating selection of the second graphical element. The second plurality of control elements is displayed concurrently with the map view and enables the user to control the second irrigation system, such that operation of the second irrigation system is changed in response to user interaction with the second plurality of control elements.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

FIG. 10 is a third user interface element of the user interface of FIG. 4, the third user interface element including a list of equipment available to be configured via the user interface, the list being presented independently of the depiction of the geographic area.

Figure 1:
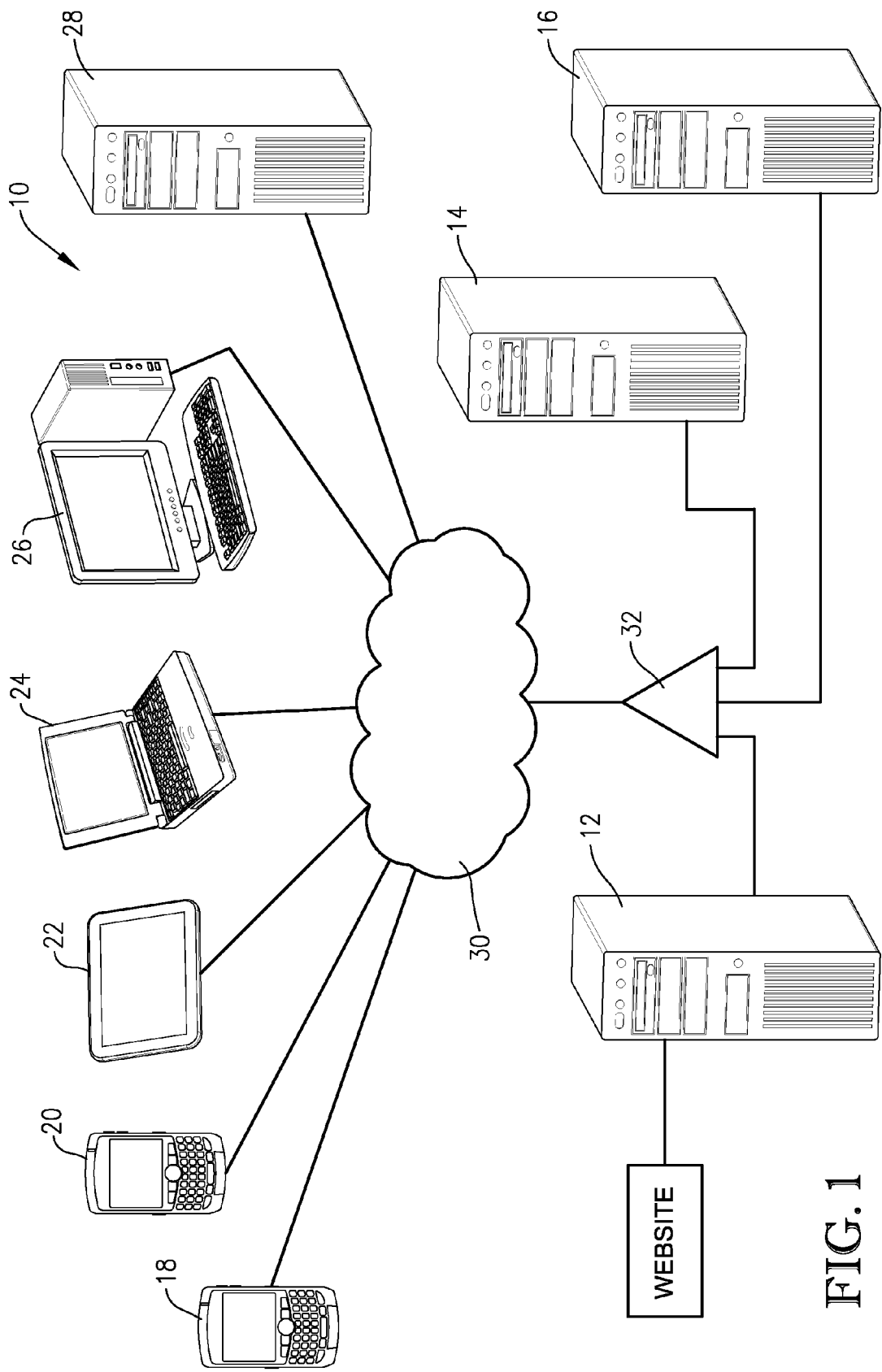
FIG. 1 is a schematic diagram of exemplary computer and communications equipment used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

Certain aspects of the present invention can be implemented in hardware, software, firmware, or a combination thereof. In one exemplary embodiment, the invention is implemented in part with a computer program or programs that operate computer and communications equipment broadly referred to by the numeral 10 in FIG. 1. The exemplary computer and communications equipment 10 may include one or more host computers 12, 14, 16 and a plurality of electronic devices 18, 20, 22, 24, 26, 28 that may access the host computers via a communications network 30. The computer programs and equipment illustrated and described herein are merely examples of programs and equipment that may be used to implement embodiments of the invention and may be replaced with other programs and computer equipment without departing from the scope of the invention.

The host computers 12, 14, 16 may serve as repositories for data and programs used to implement certain aspects of the present invention as described in more detail below. The host computers 12, 14, 16 may be any computing devices such as network or server computers and may be connected to a firewall to prevent tampering with information stored on or accessible by the computers. The functionality of the host computers 12, 14, 16 may also be distributed amongst many different computers in a cloud computing environment.

One of the host computers, such as host computer 12, may be a device that operates or hosts a website accessible by at least some of the devices 18-28. The host computer 12 includes conventional web hosting operating software, an Internet connection such as a cable connection, satellite connection, DSL converter, or ISDN converter, and is assigned a URL and corresponding domain name such as "www.lindsay.com" and/or "www.lindsay.mobi" so that the website hosted thereon can be accessed via the Internet in a conventional manner.

The host computers 14, 16 may host and support software and services of proprietary mobile application providers such as Google, Apple, and Blackberry. For example, the host computer 14 may support Google Android mobile applications and the host computer 16 may support Apple iPhone mobile applications.

Although three host computers 12, 14, 16 are described and illustrated herein, embodiments of the invention may use any combination of host computers and/or other computers or equipment. For example, the features and services described herein may be divided between the host computers 12, 14, 16 or may all be implemented with only one of the host computers.

The computer and communications equipment 10 may also include or use a data interchange format device 32 for distinguishing the types of devices (e.g. mobile phone, desktop computer) that attempt to access the host computers 12, 14, 16 and for routing communications and requests to the host computers accordingly.

The electronic devices 18-28 may be used by landowners, agriculture operations managers, and/or others wishing to view, receive, and/or provide information described herein. The electronic devices 18-28 may include various types of devices that can access the host computers 12, 14, 16 via the communications network 30. Each electronic device 18-28 preferably includes or can access a web browser and a conventional Internet connection such as a wireless connection including a Wi-Fi connection or a 3G or 4G connection, a modem, DSL converter, or ISDN converter that permits it to access the Internet.

The electronic devices 18-28 may include, for example, one or more mobile communications devices 18, 20 such as wireless phones manufactured by or for Apple or Blackberry, MP3 devices, handheld game players, or any other wireless communication device. Such mobile communication devices may be operated by agricultural managers as discussed in more detail below.

The electronic devices 18-28 may also include one or more tablet, laptop, personal, or network computers 22, 24, 26, 28 operated by one or more users as discussed in more detail below. Although FIG. 1 depicts a particular number of electronic devices 18-28, any number of devices may access the host computers 12, 14, 16.

The communications network 30 is preferably the Internet but may be any other communications network such as a local area network, a wide area network, a wireless network, or an intranet. The communications network may also be a combination of several networks. For example, the electronic devices 18-28 may wirelessly communicate with a computer or hub in a store via a Wi-Fi network, which in turn is in communication with one or more of the host computers 12, 14, 16 via the Internet or other communication network.

The computer programs of the present invention are stored in or on computer-readable medium residing on or accessible by the computer and communications equipment 10. The computer programs preferably comprise ordered listings of executable instructions for implementing logical functions in the host computers 12, 14, 16 and/or devices 18-28. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The above-described computer and communications equipment 10 may be used to monitor and control one or more irrigation systems and perform other functions described herein.

Figure 2:
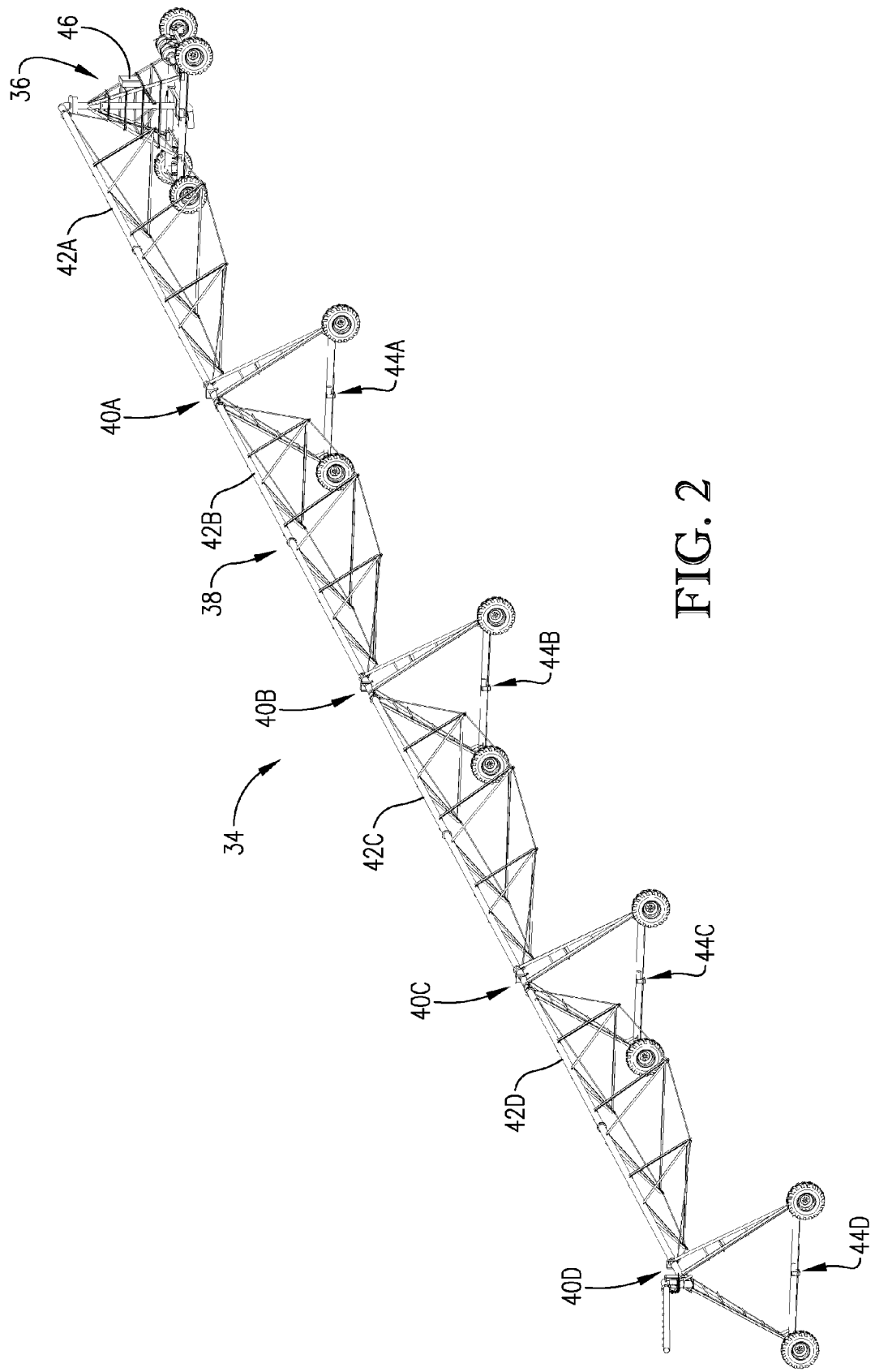
FIG. 2 is a perspective view of an exemplary lateral-move type mobile irrigation system constructed in accordance with embodiments of the invention.

A first exemplary irrigation system that may be used with the present invention is illustrated in FIG. 2. The illustrated irrigation system 34 is a lateral-move type irrigation system that broadly comprises a lateral-move cart 36 and a main section 38 connected to the lateral-move cart 36.

The lateral-move cart 36 includes a tower or similar support structure that supports and gives movement to an end of the main section 38. The cart 36 has access to an irrigation canal, well, water tank, or other source of water and may also be coupled with a tank or other dispenser to inject fertilizers, pesticides, and/or other additives into the water for application during irrigation.

The main section 38 may comprise a number of mobile support towers 40A-D. The support towers carry a conduit 42 or other fluid distribution mechanism that supplies water to a plurality of sprinkler heads, spray guns, drop nozzles, or other fluid-emitting devices that are spaced along the conduit 42 to apply water and/or other fluids beneath the irrigation system 34. Each of the support towers 40A-D includes a drive motor 44A-D for propelling the tower along the ground.

The irrigation system 34 also includes a system controller 46 preferably mounted on the lateral-move cart 36 to provide easy user access. The system controller 46 includes a computing component and other components for use with the computing component, including power components such as batteries, user interface components, and communications components for communicating with the drive motors 44A-D and/or remote communications equipment, such as a cellular phone network, the Internet or both. The system controller 46 may be encased in a waterproof housing or otherwise sealed from the environment to protect electrical components that may be damaged by water, dust or sunlight.

Figure 3:
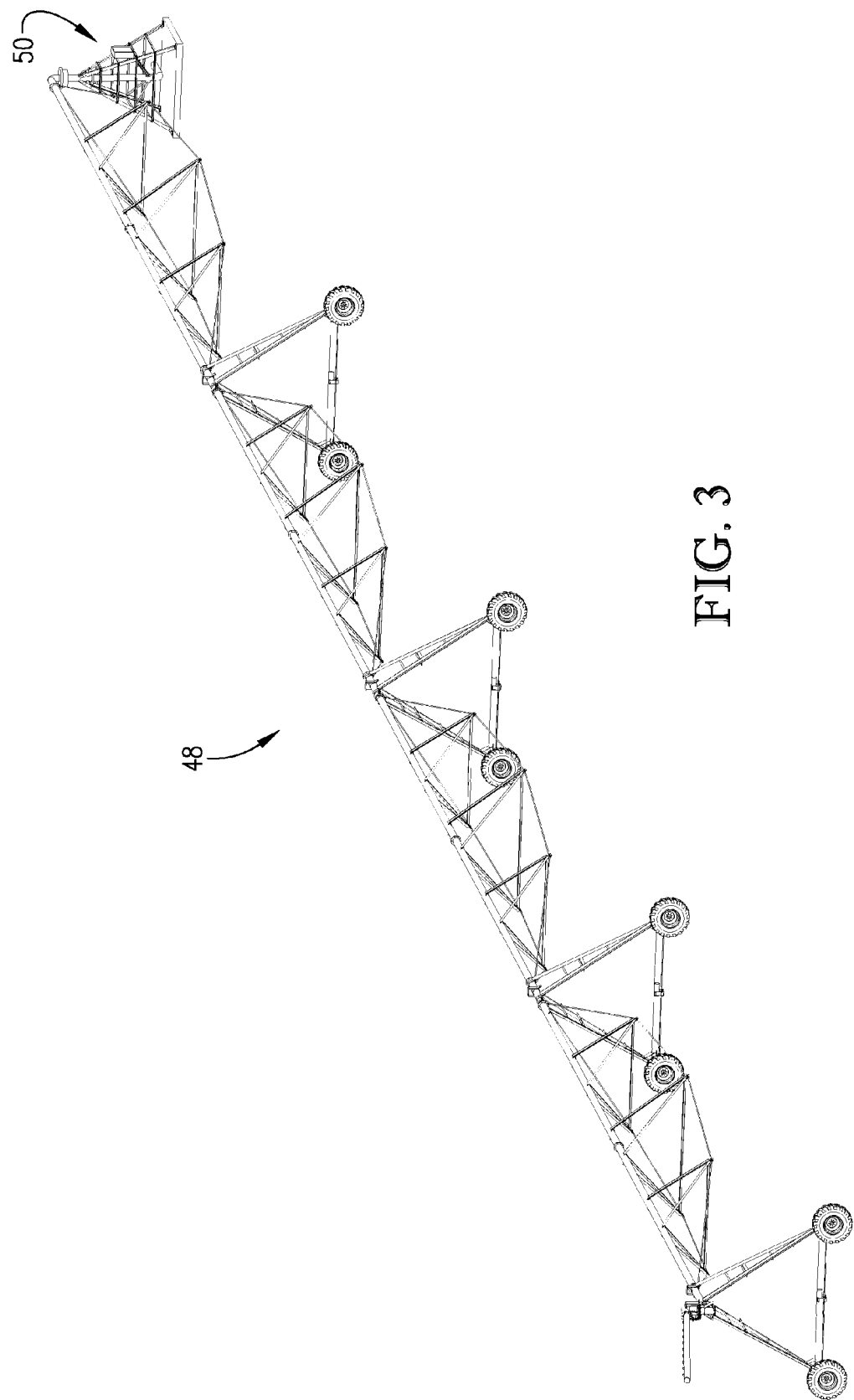
FIG. 3 is a perspective view of an exemplary pivot type mobile irrigation system constructed in accordance with embodiments of the invention.

A second exemplary irrigation system 48 that may be used with the present invention is illustrated in FIG. 3. The irrigation system 48 is a pivot type irrigation system similar to the lateral movement type irrigation system 34 described above except that the pivot type irrigation system 48 includes a stationary tower 50 about which the system 48 pivots. Like the cart 36 described above, the tower 50 has access to a well, water tank, or other source of water and may also be coupled with a tank or other dispenser to inject fertilizers, pesticides, and/or other additives into the water for application during irrigation.

The lateral-move type irrigation system 34 and the pivot type irrigation system 48 may both be substantially conventional in construction and operation. It will be appreciated by those skilled in the art that the particular structure and functionality of the irrigation system or systems used in conjunction with the present invention are not critical and may vary from one embodiment of the invention to another without departing from the spirit or scope of the present invention.

Figure 4:
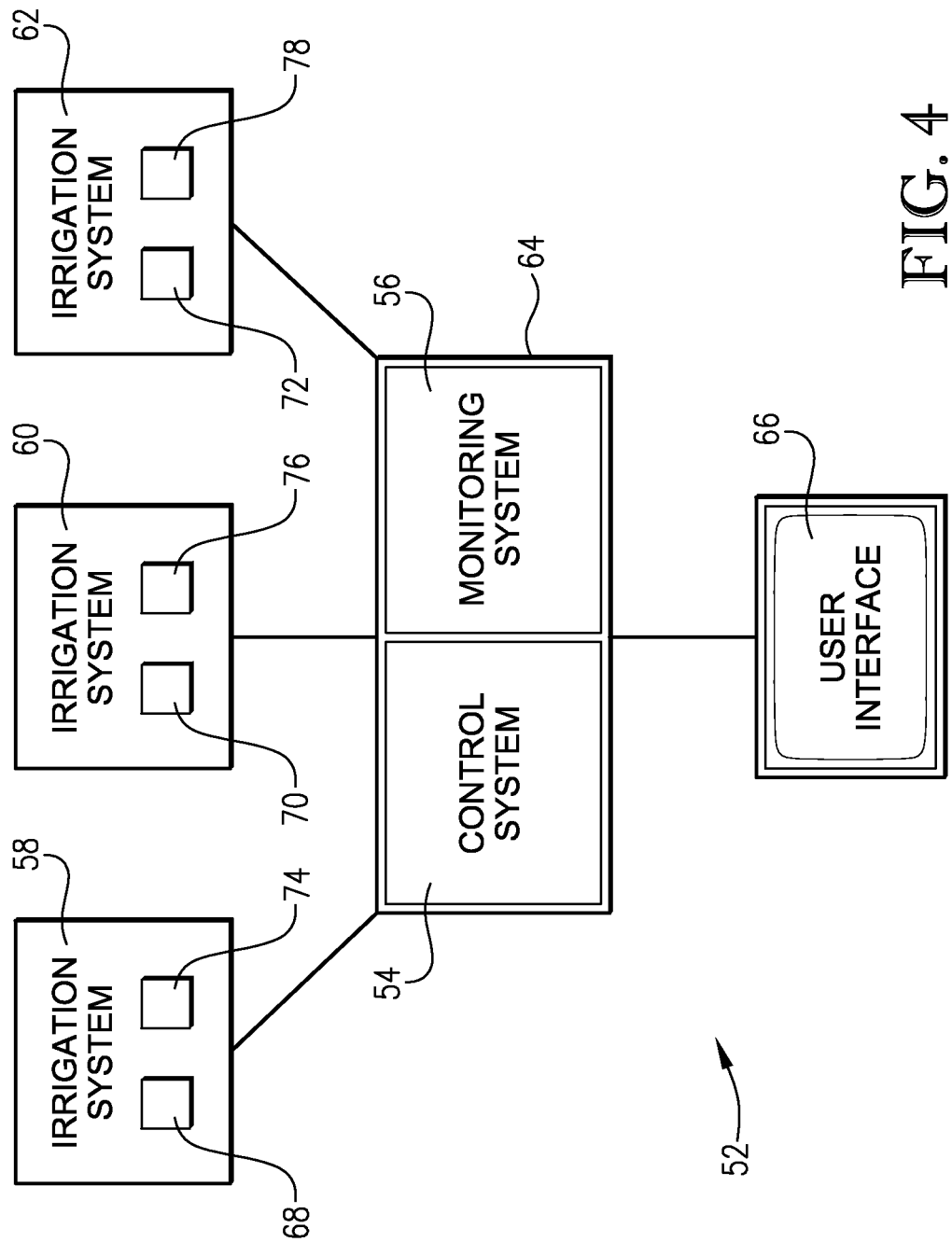
FIG. 4 is a block diagram of an irrigation management system constructed in accordance with embodiments of the invention including a user interface for enabling a user to access and configure the management system.

FIG. 4 illustrates a block diagram of an exemplary irrigation management system 52. The system 52 includes a plurality of subsystems, including a control system 54, a monitoring system 56, a plurality of irrigation systems 58, 60, 62, a communications medium 64, and a user interface 66. While the various systems are illustrated and described herein as separate, interconnected components or elements of the irrigation management system 52, it will be appreciated that certain functions may be shared by two or more of the systems and that a first one of the systems may be partially or completely integrated with a second one of the systems. For example, while the monitoring system 56 is illustrated and described herein generally as a separate system from the control system 54 and the irrigation systems 58, 60, 62, it will be appreciated that the functions of the monitoring system 56 may be partially or completely implemented using the computing resources of the control system 54 and sensing or monitoring resources built into the irrigation systems 58, 60, 62.

Each of the irrigation systems 58, 60, 62 may be similar to the first exemplary irrigation system 34 or the second exemplary irrigation system 48 described above, and may include one or more control components 68, 70, 72, one or more monitoring components 74, 76, 78, or both for use with the control system 54 or the monitoring system 56, as explained below in greater detail.

Each of the irrigation systems 58, 60, 62 is in communication with the control system 54, the monitoring system 56, or both via the communications medium 64 to enable communication of status information from the irrigation systems 58, 60, 62 to the control 54 and monitoring 56 systems and control data from the control system 54 to the irrigation systems 58, 60, 62.

The irrigation management system 52 may include virtually any number of irrigation systems. While the exemplary irrigation management system 52 represented by the diagram of FIG. 4 includes three irrigation systems, it will be appreciated that the present invention may include fewer or more irrigation systems. The user interface element depicted in FIG. 5, for example, and discussed in greater detail below, includes graphical elements corresponding to nine irrigation systems, all of which may be a part of an irrigation management system constructed in accordance with principles of the present invention.

The control system 54 comprises one or more computing components and may be local to or remote from the irrigation systems 58, 60, 62. For example, the control system 54 may be partially or completely implemented by one or more of the host computers 12, 14, 16 including web servers, application servers, or both. The control system 54 may be implemented at least in part by circuitry or controllers associated with the irrigation systems 58, 60, 62, such as the system controller 46. Thus, the control system 54 may be substantially centralized, or may be distributed across multiple systems and geographic areas, such as where certain functions of the control system 54 are implemented by the system controller 46 and certain functions of the control system 54 are implemented by one or more of the computers 12, 14, 16.

The control system 54 receives programming information and manual commands from users via the user interface 66, receives irrigation system status information from the monitoring system 56, and manages operation of the irrigation systems 58, 60, 62 according to the information received from the users and from the monitoring system 56. The programming information includes instructions enabling the control system 54 to automatically manage operation of one or more of the irrigation systems 58, 60, 62. By way of example, the programming information may include an irrigation start time, an irrigation stop time, an irrigation end position, an irrigation application rate, or chemical application information, or any combination thereof. The control system 54 would then communicate control commands to the irrigation systems 58, 60, 62 according to the programming information received from the user such that the irrigation systems 58, 60, 62 operate according to the programming information without the need for the user to manually start, stop or otherwise provide manual commands to the irrigation systems 58, 60, 62.

The control system 54 is also configured to receive manual commands from the user via the user interface 66. Manual commands refer to operational commands executed by the control system 54 upon receiving the commands with little or no delay, as if the user were manually controlling the irrigation systems 58, 60, 62. The user may desire to submit manual commands to the control system 54, for example, to interrupt operation of one of the irrigation systems 58, 60, 62 in response to changes in the weather or in response to a mechanical malfunction.

The irrigation system status information is collected by the monitoring system 56 and may include a current position of an irrigation system, travel status including whether an irrigation system is moving or stopped, a current direction of travel of an irrigation system, a current water application rate, a current accessory application rate, and the occurrence of an unanticipated event. An unanticipated event is an event that disrupts operation of the irrigation system or requires user intervention. By way of example, an unanticipated event may be a low water pressure fault or an irrigation system alignment fault. The monitoring system 56 may include sensors attached to or embedded in the irrigation systems 58, 60, 62, circuitry for receiving operational information from the irrigation system controller 46, or other hardware or software for collecting the irrigation system status information.

The user interface 66 allows users to interact with the control system 54 and may include a graphical user interface for displaying information about the irrigation systems 58, 60, 62 and for receiving instructions from a user. The user interface 66 is preferably presented remotely from the irrigation systems 58, 60, 62, such as where the user interface 66 is accessible via the Internet such that a user may access the user interface 66 from any device with Internet access, including desktop or laptop computers, smartphones, and computer tablet devices. By way of example, the user interface 66 may be presented as, or as part of, a webpage defined by a hypertext markup language (HTML) document and presented according to the hypertext transfer protocol (HTTP). The user interface 66 includes the various graphical user interface elements described in detail below as well as other controls, whether mechanical or electronic, that enable the user to interact with the control system 54.

The communications medium 64 may include wired and wireless communications systems and components for enabling communication between the various elements of the irrigation management system 52. The communications medium 64 preferably includes a wireless communications network, such as the cellular network, for enabling wireless communications with the irrigation systems 58, 60, 62. The communications medium may further include the communications network 30 described above.

Figure 5:
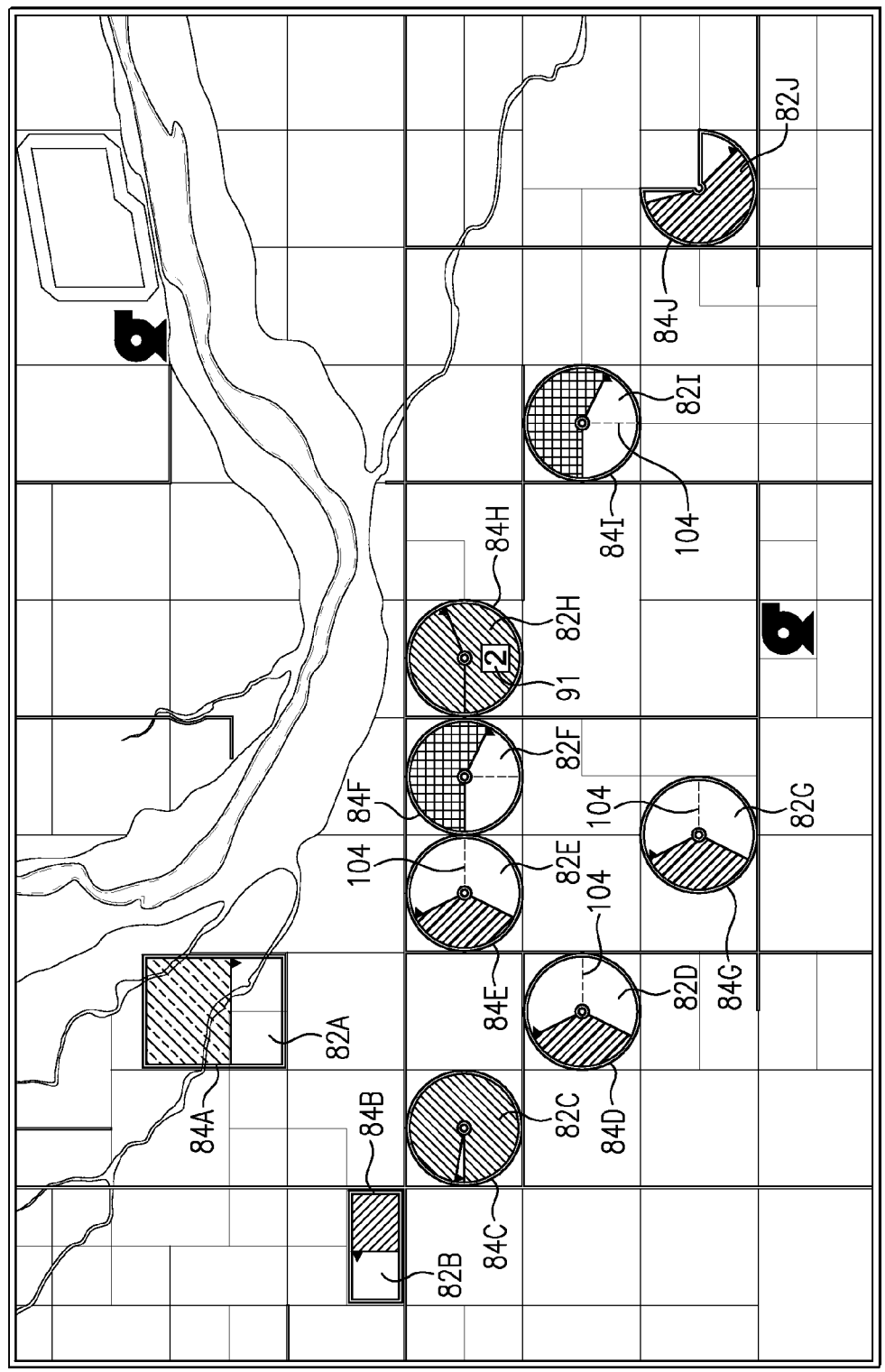
FIG. 5 is a first user interface element of the user interface of FIG. 4, the first user interface element including a depiction of a geographic area and a plurality of graphical elements within the geographic area indicating irrigated areas and irrigation systems associated with the irrigated areas.
Figure 7:
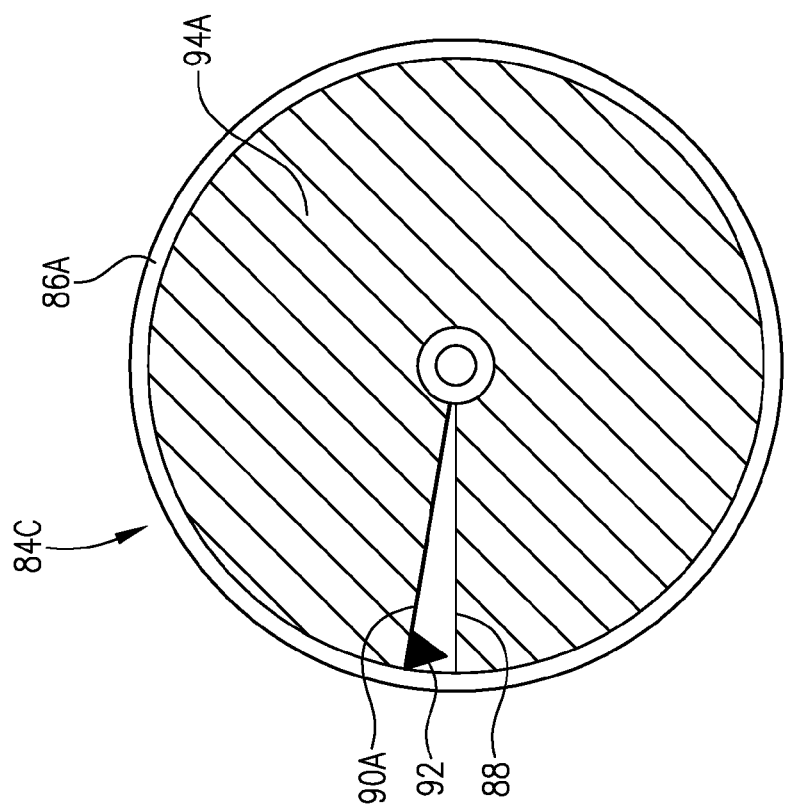
FIG. 7 illustrates a second one of the graphical elements of FIG. 5 corresponding to a lateral-move type irrigation system.
Figure 6:
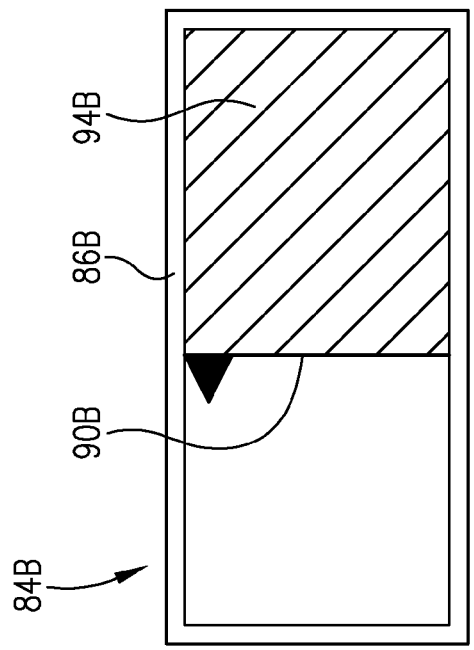
FIG. 6 illustrates a first one of the graphical elements of FIG. 5 corresponding to a pivot type irrigation system.
Figure 8:
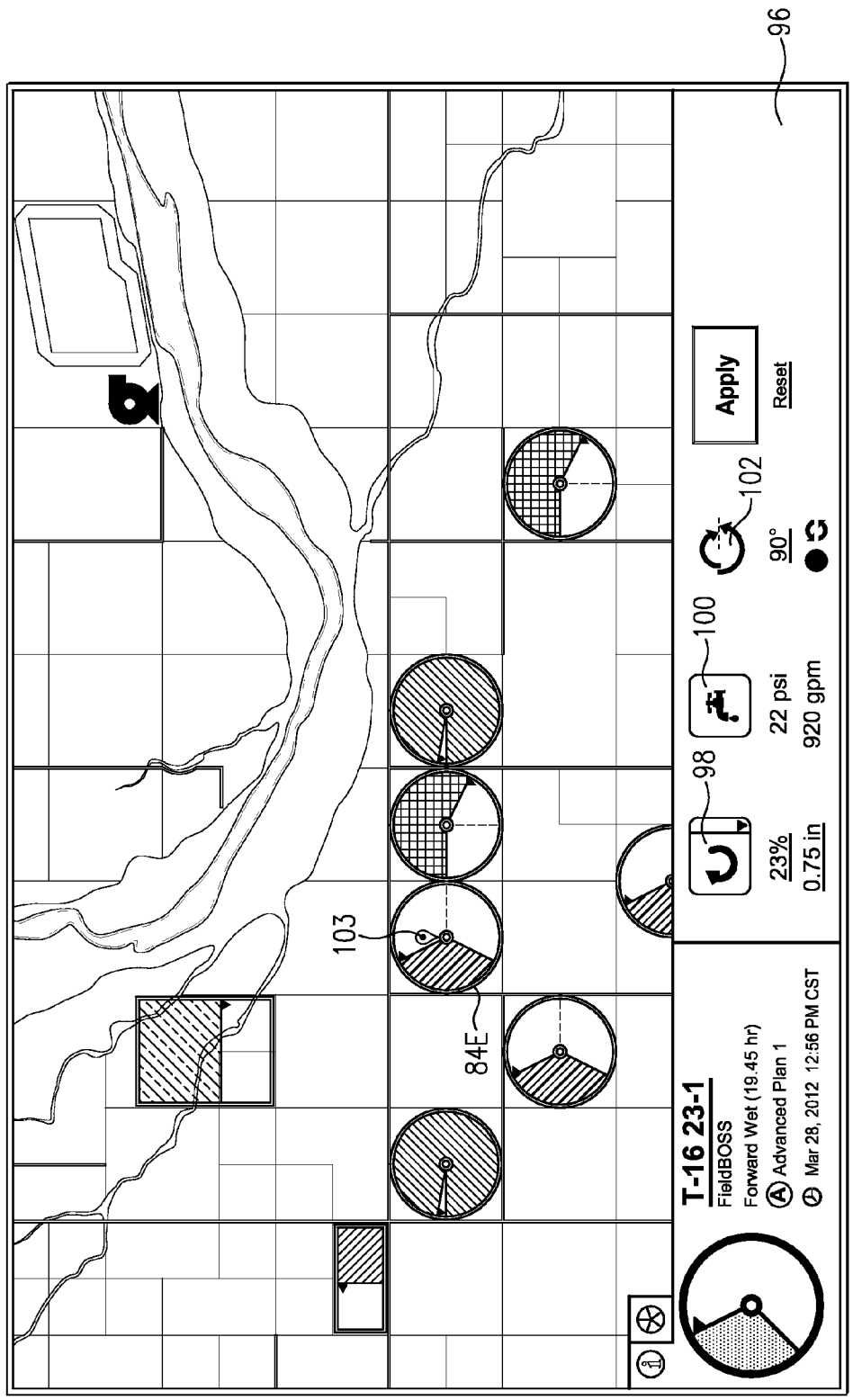
FIG. 8 is the user interface element of FIG. 5, including an interactive control panel for enabling the user to control aspects of the operation of the irrigation system, the interactive control panel being displayed concurrently with the depiction of the geographic area.

Exemplary user interface elements are depicted in FIGS. 5-10. FIG. 5 illustrates a user interface element 80 that may occupy part or all of a display screen, such as a display on one of the electronic devices 18-26. The user interface element 80 includes a map view with a depiction of a geographic area that includes a plurality of irrigated areas 82A-J, wherein each irrigated area 82 is irrigated by an irrigation system. Some of the irrigated areas, such as areas 82A and 82B, may be irrigated by lateral-move type irrigation systems similar to the system 34 described above, while other of the irrigated areas, such as areas 82C-J, may be irrigated by pivot type irrigation systems similar to the system 48 described above.

The map view enables the user to visualize a geographic area in which the irrigation systems operate, and to identify and manage the various irrigation systems according to their actual location in the geographic area. Thus, the map view includes a depiction of a geographic area that includes irrigated areas in which the irrigation systems operate. The geographic area depicted in the map view may be virtually any size, including large enough to include hundreds of irrigation systems, and small enough to include a single irrigation system. Stated differently, the geographic area depicted in the map view may be as large as hundreds of square miles or may be as small as less than one square mile. Furthermore, the user may increase the total size of the geographic area ("zoom out") and may decrease the total size of the geographic area ("zoom in") in a conventional manner. As the size of the geographic area increases additional irrigated areas (and the corresponding irrigation systems) will be depicted, and as the size of the geographic area decreases some irrigated areas will be removed from the map view. The map view may also include a pan function wherein the user can cause the depiction of the geographic area to "move" in a particular direction—such as north, south, east, or west—such that the map view displays a depiction of a new geographic area.

The depiction of the geographic area may include an image of the area, such as an aerial photograph of the area captured by an airplane or a satellite. Alternatively, the depiction of the geographic area may include a representation of certain features of the geographic area, such as a map created to illustrated the locations of roads, cities, rivers, topography, terrain and similar landmarks or characteristics of the geographic area. The map view preferably includes an indication of the cardinal directions, such as a north arrow or a compass rose. Alternatively, the indication of the cardinal directions may be inherent, such as where the top of the map view display always corresponds to north. Including an indication of the cardinal directions as part of the map view enables the user to understand the orientation of the geographic area depicted in the map view and recognize the actual positions of the irrigation systems relative to the cardinal directions. The user could recognize, for example, the position of each irrigation system relative to north.

The user interface element 80 includes a graphical element or icon associated with each of the irrigation systems located in the geographic area and under control of the control system 54. In the illustrated embodiment, each graphical element 84A-J is a status icon associated with an irrigation system that provides real-time or near real-time visual status information relating to the associated irrigation system. Each of the status icons 84A-J includes a border 86 approximately outlining the irrigated area, and may further include a first line 88 indicating a starting position of the irrigation system, a second line 90 indicating a current position of the irrigation system and an arrow 92 indicating a direction of travel of the irrigation system. The arrow may be omitted to indicate that the irrigation system has completed an irrigation run and is no longer irrigating. A filled or colored area 94 of each status icon 84 illustrates progress of the irrigation system by indicating an area that has been irrigated in a current irrigation run or otherwise covered by the irrigation system. Stated differently, the filled or colored area depicts the area between the starting position 88 and the current position 90 of the irrigation system. Thus, a user can quickly and easily determine which portion of the irrigated areas has been irrigated in the current irrigation run by observing which portion of the status icon 84 is filled or colored.

If a pivot type irrigation system is programmed to run continuously, the corresponding status icon 84 associated with that irrigation system may reflect a starting position 88 of the irrigation system, a current position 90 of the irrigation system and an indicator 91 of a number of continuous rotations the irrigation system has completed. Status icon 84H is an example of such an icon.

A visual indicator, such as a color or shade of each status icon 84A-J, may be used to indicate an operational status of the associated irrigation system. In the illustrated embodiment of the user interface element 80, the different hatch patterns indicate different visual indicators, such as different colors or shades of colors. In one exemplary embodiment, a blue status icon indicates the associated irrigation system is currently irrigating, an orange status icon indicates a special operation, such as irrigating and applying a chemical, a red status icon indicates an unanticipated event has occurred such as an unanticipated stop, a green status icon indicates the irrigation system is running dry (i.e., not irrigating or applying a chemical), and a gray status icon indicates the irrigation system is not operating.

The user interface element 80 enables the user to quickly and easily identify each of the irrigation systems, determine aspects of the programmed irrigation plan associated with each of the systems, and view a current operating status of each irrigation system. The control system 54 may continuously or periodically receive status information from the monitoring system 56 and continuously or periodically update the status icons 84 to reflect changes in the status information. Thus, the status icons 84 may be updated to reflect the status of the irrigation systems in real time or in substantially real time, depending on the capabilities of the communication medium 64. Alternatively, the status icons 84 may be updated periodically, such as once per hour or several times per day. As used herein, "real time" refers to operations that are performed instantaneously or with no perceptible delay from a user's viewpoint.

If a user selects one of the status icons 84A-J, such as via a mouse click or a touchscreen tap, the user interface 66 presents an interactive control panel 96 or "quick tray" for enabling the user to configure operation of the irrigation system associated with the selected status icon. The interactive control panel 96 includes operational information of the irrigation system and one or more controls 98, 100, 102 associated with the irrigation system. The control panel 96 is presented concurrently with the depiction of the geographic area, and occupies a relatively small portion of the user interface element 80. Thus, the one or more controls 98, 100, 102 may represent only a subset of the control features associated with each of the irrigation systems, as explained below in greater detail, to minimize the amount of display area occupied by the interactive control panel 96.

In the illustrated embodiment, the control panel 96 is positioned at or near a bottom of the user interface element 80 and occupies a portion of the user interface element 80 approximately equal to one-fourth to one-third of the total area of the user interface element 80. It will be appreciated that the control panel 96 may occupy virtually any portion of the user interface element 80 including the left side, the right side, the top or even a portion of the user interface element 80 not adjacent any of the edges. The user interface 66 may present a marker 103 or similar indicator of the irrigation system currently associated with the controls in the control panel 96.

A first control 98 enables the user to manually start and stop the irrigation system and change the direction of travel of the irrigation system. If the irrigation system is a pivot type irrigation system, for example, selecting the first control 98 may present a pop-up menu with options such as "clockwise," "counterclockwise," and "stop." If the irrigation system is a lateral-move type irrigation system, selecting the first control 98 may present a pop-up menu with options such as "forward," "reverse," and "stop." A second control 100 enables the user to activate and deactivate a water dispensing function of the irrigation system. The second control 100 may be a toggle button presenting a first color if the water dispensing function is currently activated and presenting a second color if the water dispensing function is currently deactivated.

A third control 102 enables the user to select a "service stop" or automatic stop position of the irrigation system. If the irrigation system is a pivot type irrigation system, for example, selecting the third control 102 may present a pop-up menu for selecting an ending position in degrees or, alternatively, may present a graphical element for graphically selecting the stop position. The stop position selected via the third control 102 is the position at which the control system 54 will automatically shut down the irrigation system. The status icons 84 may include an indicator 104 of the automatic stop position. The third control 102 may also enable the user to remove the stop position such that the irrigation system runs continuously until the user intervenes and shuts it off.

In the illustrated embodiment, the control panel 96 relates to operation of the irrigation system associated with the status icon 84E. If the user selects a second status icon 84, such as one of the status icons 84A-D or 84F-J, the control panel 96 is replaced with another control panel that is identical in form and function but relates to operation of the irrigation system associated with the second selected status icon 84. Thus, the user can quickly and easily manage operation of each of the irrigation systems by simply selecting a status icon 84 associated with a system, manipulating the control panel 96 associated with that status icon 84, and moving on to another irrigation system by selecting the status icon 84 associated with that irrigation system. Notably, selecting a status icon 84 does not cause the user interface 66 to completely remove or close the user interface element 80 or load a completely new user interface element. Rather, selecting a status icon 84 causes the user interface 66 to present a relatively low profile interactive control panel as part of the user interface element 80 and concurrently with the map view with the depiction of the geographic area including the irrigation system associated with the selected status icon. This may be particularly advantageous where, for example, a user accesses the control system 54 via a data communications link with limited bandwidth.

Figure 9:
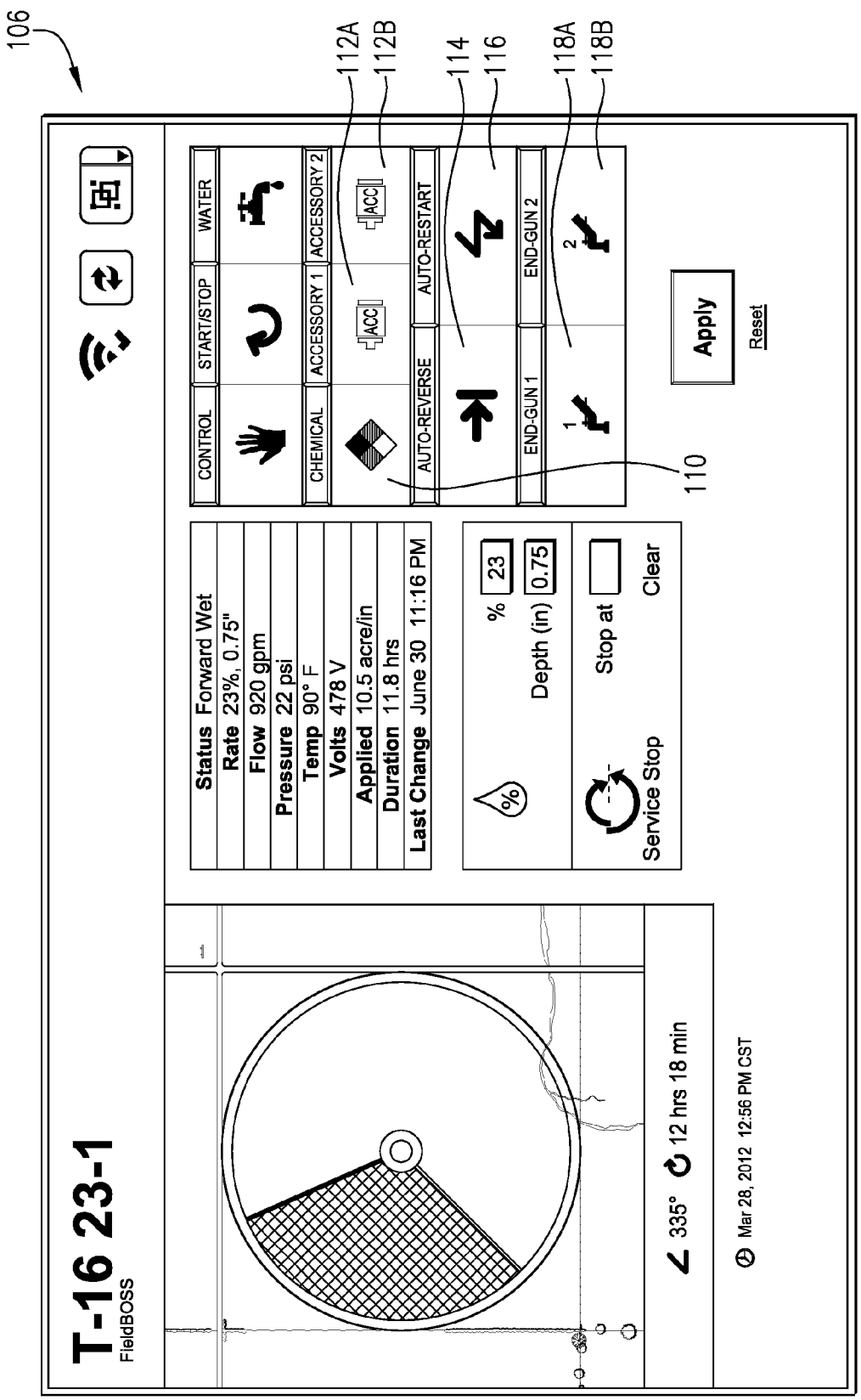
FIG. 9 is a second user interface element of the user interface of FIG. 4, the user interface element including an interactive control panel for controlling the irrigation system and presented independently of the depiction of the geographic area.

FIGS. 9 and 10 illustrate additional user interface elements associated with the user interface 66. The user interface element 106 illustrated in FIG. 9 includes control element and status information relating to a one of the irrigation systems. The user interface element 106 generally includes more information and more control capabilities than the control panel 96 discussed above. The user interface element 106 includes, for example, a control element 110 for managing the application of chemicals, a plurality of control elements 112A, 112B for managing irrigation accessories, a control element 114 for managing an automatic reverse function, a control element 116 for managing an automatic restart function, and a plurality of control elements 118A, 118B for managing operation of irrigation system end guns. The user interface element 106 may be accessed, for example, by double clicking one of the status icons 84. The user interface element 108 illustrated in FIG. 10 includes a list of equipment in the irrigation management system 52.

Although the invention has been described with reference to the exemplary embodiments illustrated in the attached drawings, it is noted that equivalents may be employed and substitutions made herein without departing from the scope of the invention as recited in the claims. For example, the interactive control panel 96 described above may include virtually any controls for controlling the respective irrigation system, such as end gun controls and accessory controls. Furthermore, the graphical elements 84 may be virtually any shape and need not conform to an outline of the respective irrigated area.

Having thus described various embodiments of the invention, what is claimed as new and desired to be protected by Letters Patent includes the following:

The invention claimed is:

1. An irrigation management system comprising:
a control system for controlling a first irrigation system that applies water in a first irrigated area and a second irrigation system that applies water in a second irrigated area, the control system comprising a computer-readable, non-transitory storage medium storing instructions, which, when executed by one or more processors, causes the one or more processors to perform operations comprising:
displaying a user interface for enabling a user to configure the control system, the user interface presenting a map view of a geographic area including the first irrigated area and the second irrigated area, the map view including a first graphical element corresponding to the first irrigation system and a second graphical element corresponding to the second irrigation system and depicting a shape of each irrigated area and a position of each irrigation system within its irrigated area, each graphical element being an irrigation system status icon including a border approximately outlining its irrigated area, a first line indicating a starting position of its irrigation system, a second line indicating a current position of its irrigation system, and an arrow indicating a direction of travel of its irrigation system, and an indicator representing a number of continuous rotations its irrigation system has completed, each graphical element being at least partially colored wherein a first colored status indicates its irrigation system is currently irrigating, a second colored status indicates a special operation, a third colored status indicates an unanticipated event has occurred, a fourth colored status indicates its irrigation system is not irrigating or applying a chemical, and a fifth colored status indicates its irrigation system is not operating,
the user interface presenting a first interactive control panel for controlling the first irrigation system concurrently with the map view when the user selects the first graphical element, and presenting a second interactive control panel for controlling the second irrigation system concurrently with the map view when the user selects the second graphical element,
the first interactive control panel and the second interactive control panel each including controls for enabling the user to activate and deactivate movement of the respective irrigation system, select a direction of travel of the respective irrigation system, activate and deactivate a water dispensing function in each respective irrigation system, and set an automatic stop position for the respective irrigation system, and
the user interface presenting only one of the first interactive control panel and the second interactive control panel at a time, wherein selecting the second graphical element causes the first interactive control panel to be replaced by the second interactive control panel and selecting the first graphical element causes the second interactive control panel to be replaced by the first interactive control panel, the user interface presenting a marker of the irrigation system currently associated with the controls of the active interactive control panel;

displaying a user interface element for each irrigation system, each user interface element including additional information and additional control capabilities, the additional control capabilities comprising a control element for managing application of chemicals, a plurality of control elements for managing irrigation accessories, a control element for managing an automatic reverse function, a control element for managing an automatic restart function, and a plurality of control elements for managing operation of irrigation system end guns;

displaying an equipment table having a plurality of listings each representing a unit of irrigation equipment, each listing including:
  a name uniquely identifying the unit;
  a status entry including a descriptor relating to the current operation of the unit and a type icon representing a type of the unit, the type icon having a characteristic representative of a current progress of the unit if the unit is an irrigation system such that the user may determine the current progress of the irrigation system by viewing the type icon, the type icon having a characteristic representative of whether the unit is running or not if the unit is a pump, the status entry including a warning sign positioned near the type icon if an unanticipated event has been detected for the unit;
  a current running time of the unit;
  a connectivity icon representing a current wireless communication connectivity of the unit; and
  a time that the listing was most recently updated;

determining a first input is received from the user indicating the first irrigation system;

displaying, in response to the first input, the first interactive control panel;

determining a second input is received from the user indicating the second irrigation system;

displaying, in response to the second input, the second interactive control panel;

determining a third input is received from the user indicating the user wishes to further control one of the irrigation systems; and displaying, in response to the third input, the user interface element corresponding to the irrigation system that the user wishes to further control.

2. The system of claim 1, the map view including an aerial image of the geographic area.

3. The system of claim 1, the aerial image being a satellite image of the geographic area.

4. The system of claim 1, the user interface presented remotely from the irrigation systems via a computer network.

5. An irrigation system controlling method comprising:
a control system for controlling a first irrigation system that applies water in a first irrigated area and a second irrigation system that applies water in a second irrigated area, the control system comprising a computer-readable, non-transitory storage medium storing instructions, which, when executed by one or more processors, causes the one or more processors to perform operations comprising:

displaying a user interface for enabling a user to configure the control system, the user interface presenting a map view of a geographic area including the first irrigated area and the second irrigated area, the map view including a first graphical element corresponding to the first irrigation system and a second graphical element corresponding to the second irrigation system and depicting a shape of each irrigated area and a position of each irrigation system within its irrigated area, the user interface presenting a first interactive control panel for controlling the first irrigation system concurrently with the map view when the user selects the first graphical element, and presenting a second interactive control panel for controlling the second irrigation system concurrently with the map view when the user selects the second graphical element, the first interactive control panel and the second interactive control panel each including controls for enabling the user to activate and deactivate movement of the respective irrigation system, select a direction of travel of the respective irrigation system, activate and deactivate a water dispensing function in each respective irrigation system, and set an automatic stop position for the respective irrigation system, and the user interface presenting only one of the first interactive control panel and the second interactive control panel at a time, wherein selecting the second graphical element causes the first interactive control panel to be replaced by the second interactive control panel and selecting the first graphical element causes the second interactive control panel to be replaced by the first interactive control panel, the user interface presenting a marker of the irrigation system currently associated with the controls of the active interactive control panel;

displaying a user interface element for each irrigation system, each user interface element including additional information and additional control capabilities, the additional control capabilities comprising a plurality of control elements for managing irrigation accessories and a plurality of control elements for managing operation of irrigation system end guns;

displaying an equipment table having a plurality of listings each representing a unit of irrigation equipment, each listing including:
  a name uniquely identifying the unit;
  a status entry including a descriptor relating to the current operation of the unit and a type icon representing a type of the unit, the type icon having a characteristic representative of a current progress of the unit if the unit is an irrigation system such that the user may determine the current progress of the irrigation system by viewing the type icon, the type icon having a characteristic representative of whether the unit is running or not if the unit is a pump, the status entry including a warning sign positioned near the type icon if an unanticipated event has been detected for the unit;
  a current running time of the unit;
  a connectivity icon representing a current wireless communication connectivity of the unit; and
  a time that the listing was most recently updated;

determining a first input is received from the user indicating the first irrigation system;

displaying, in response to the first input, the first interactive control panel;

determining a second input is received from the user indicating the second irrigation system;

displaying, in response to the second input, the second interactive control panel;

determining a third input is received from the user indicating the user wishes to further control one of the irrigation systems; and displaying, in response to the third input, the user interface element corresponding to the irrigation system that the user wishes to further control.

\* \* \* \* \*